UNITED STATES PATENT OFFICE.

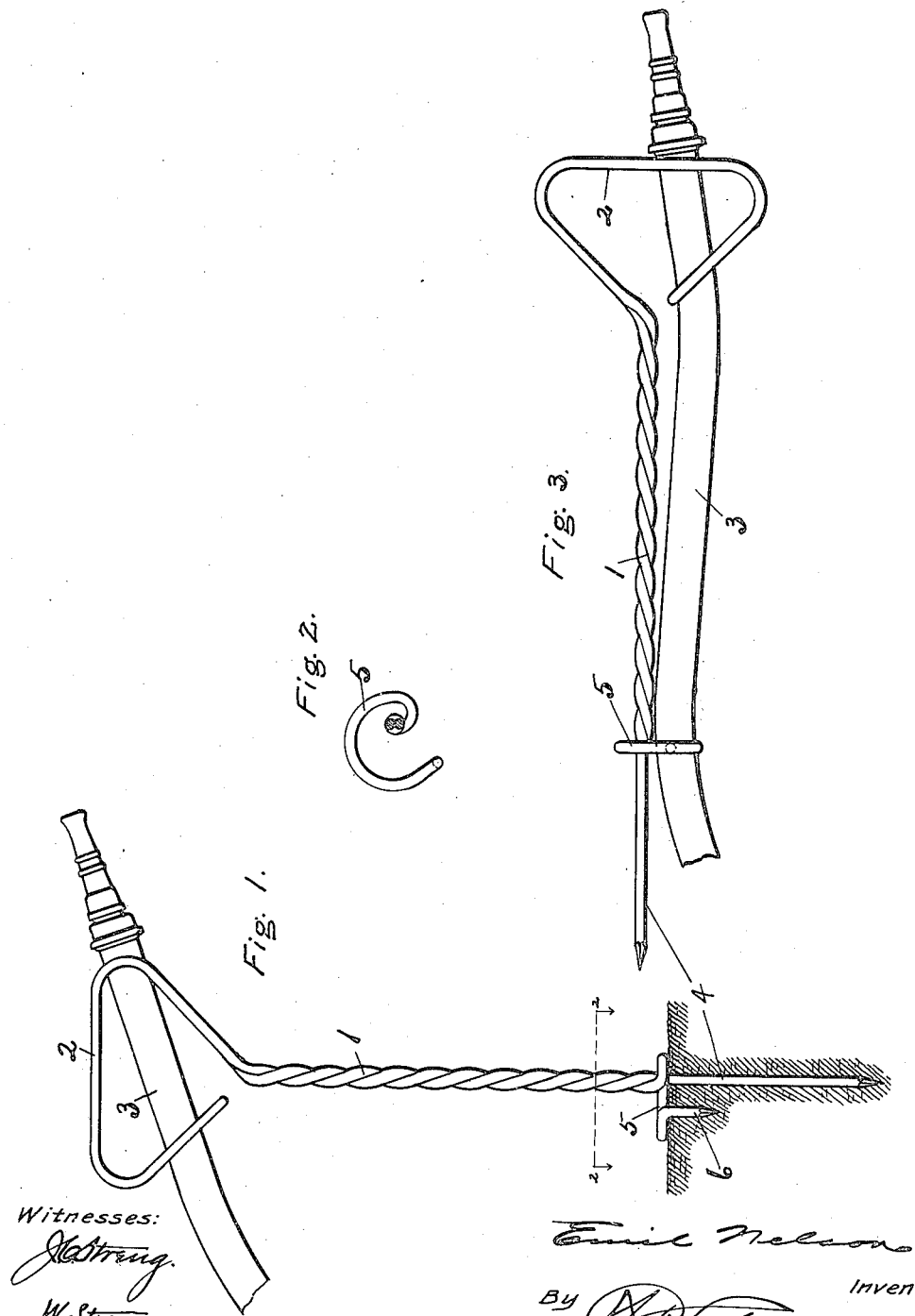

EMIL NELSON, OF PORTLAND, OREGON.

NOZZLE-HOLDER.

1,144,495.  Specification of Letters Patent.  Patented June 29, 1915.

Application filed July 21, 1913. Serial No. 780,268.

*To all whom it may concern:*

Be it known that I, EMIL NELSON, a citizen of the United States, residing in the city of Portland, county of Multnomah, and State of Oregon, have invented certain new and useful Improvements in Nozzle-Holders, of which the following is a specification.

My invention relates to hose nozzle holders, and has for its objects to provide a very simple and inexpensive wire hose nozzle holder which can be conveniently applied to the nozzle end of a sprinkling hose and carried thereby when the hose is put away or is being held in the hand, said holder being adapted to fold along the hose lengthwise thereof and to be held in place by a part thereof which is quickly detachable from said hose, to provide in such a hose nozzle holder a construction having a single leg or prong adapted to be thrust into the ground with a short off-set prong which acts, not only as a foot piece by means of which it can be pushed into the ground, but which acts as a means for preventing the holder from turning and changing the direction of the nozzle whenever the body of the hose is moved.

In order that others may understand my invention, I have shown on the accompanying sheet of drawings one practical form thereof, which I will now describe.

In the drawings,—Figure 1 is a side elevation showing my improved and simplified hose nozzle holder in use; Fig. 2 is a cross sectional view thereof taken on the line 2—2 of Fig. 1; and Fig. 3 shows how the holder is attached to the hose lengthwise thereof to be carried from place to place, or stored away when not in use.

The hose nozzle holder here shown comprises a body portion 1, here shown formed of twisted wire, a hose holding loop 2, between the parts of which the hose 3 can be adjusted to different angles, a prong 4, adapted to be thrust into the ground, as indicated, and an off-set loop or ring 5, which terminates in a downwardly projecting prong 6, formed at a distance from the main prong 4, whereby to prevent the holder from being accidentally turned in the ground so as to change the direction of the hose nozzle. The off-set loop 5 serves as a foot piece for conveniently pushing the prong 4 into the ground, and also as a holding or attaching means for attaching the lower end of the holder to the body of the hose when not in use, thus making it convenient to put the holder away with the hose. If desired, the hose holding loop 2 can be used as a handle by means of which to hold the nozzle end of the hose in the hand for sprinkling purposes, and also for changing the position of the hose from place to place.

Thus I provide a most simple, practical and economical hose nozzle holder, and while I have shown but one form thereof, I am aware that modifications can be made therein without departing from the spirit of the invention, and I do not limit the invention to this particular form, except as I may be limited by the hereto appended claims.

I claim:

1. A hose nozzle holder of the character referred to comprising a body having a hose holding loop at its upper end, a prong at its lower end and an off-set loop intermediate its ends adapted to be hooked around the body of the hose, for the purpose described.

2. A hose nozzle holder of the character referred to comprising a body having a hose holding loop at its upper end, a prong at its lower end and an off-set loop intermediate its ends adapted to be placed around the body of the hose and terminating in a downwardly depending prong adapted to be thrust into the ground to prevent the holder from turning.

3. A hose nozzle holder of the character referred to comprising a body formed of twisted wires with their upper ends formed into a hose holding loop, one of said wires being made into a prong at its lower end, adapted to be thrust into the ground, and another of said wires being formed into an off-set loop adapted to be placed around the body of the hose when said holder body is positioned lengthwise of said hose, substantially as shown and described.

Signed at Portland, Oregon, this 11th day of July, 1913.

EMIL NELSON.

In presence of—
R. B. FRENCH,
G. LITZENBERG.